(12) United States Patent
Rolfsson et al.

(10) Patent No.: US 9,630,782 B2
(45) Date of Patent: Apr. 25, 2017

(54) SCRAPER BLADE ADAPTED TO SCRAPE OFF MATERIAL FROM A CONVEYOR BELT SURFACE AND SCRAPER FOR A CONVEYOR BELT

(71) Applicant: Metso Minerals (Sweden) AB, Trelleborg (SE)

(72) Inventors: Jerker Rolfsson, Trelleborg (SE); Luiz Fabio Pinto, Sorocaba (BR)

(73) Assignee: Metso Minerals (Sweden) AB, Trelleborg (SE)

( * ) Notice: Subject to any disclaimer, the term of this patent is extended or adjusted under 35 U.S.C. 154(b) by 0 days.

(21) Appl. No.: 14/905,888

(22) PCT Filed: Jul. 11, 2014

(86) PCT No.: PCT/EP2014/064885
§ 371 (c)(1),
(2) Date: Jan. 18, 2016

(87) PCT Pub. No.: WO2015/010921
PCT Pub. Date: Jan. 29, 2015

(65) Prior Publication Data
US 2016/0152417 A1    Jun. 2, 2016

(30) Foreign Application Priority Data

Jul. 22, 2013 (SE) .................................... 1350908

(51) Int. Cl.
*B65G 45/16* (2006.01)
*B65G 45/12* (2006.01)

(52) U.S. Cl.
CPC ............. *B65G 45/16* (2013.01); *B65G 45/12* (2013.01)

(58) Field of Classification Search
CPC ................................ B65G 45/16; B65G 45/12
(Continued)

(56) References Cited

U.S. PATENT DOCUMENTS 4,489,823 A * 12/1984 Gordon .................. B65G 45/12
15/256.5
4,533,036 A    8/1985 Gordon
(Continued)

FOREIGN PATENT DOCUMENTS

DE        19508090        9/1996
EP        1302417 A1      4/2003
(Continued)

OTHER PUBLICATIONS

International Search Report for PCT/EP2014/064885 mailed Oct. 27, 2014.
(Continued)

*Primary Examiner* — Gerald McClain
*Assistant Examiner* — Keith R Campbell
(74) *Attorney, Agent, or Firm* — Andrus Intellectual Property Law, LLP

(57) ABSTRACT

A scraper blade adapted to scrape off material from a conveyor belt surface, including a mounting portion at one end, and a scraper tip at the other end. The scraper blade includes by a scraper portion extending from the scraper tip and to a point adjacent to or in the mounting portion. The scraper blade includes at least one side wall which is tapered from the scraper tip towards the mounting portion. One or more scraper blades form a scraper for a conveyor belt.

7 Claims, 4 Drawing Sheets

(58) Field of Classification Search
USPC .................................................. 198/497–499
See application file for complete search history.

(56) References Cited

U.S. PATENT DOCUMENTS

| | | | |
|---|---|---|---|
| 4,694,952 A | 9/1987 | Meijer | |
| 7,383,940 B1 | 6/2008 | Stumpf et al. | |
| 7,669,708 B2 * | 3/2010 | Swinderman | B65G 45/16 198/497 |
| 8,464,858 B2 * | 6/2013 | Kirschner | B65G 45/16 198/499 |
| 2003/0066738 A1 * | 4/2003 | Veenhof | B65G 45/16 198/497 |
| 2009/0294252 A1 | 12/2009 | Swinderman | |

FOREIGN PATENT DOCUMENTS

| | | |
|---|---|---|
| GB | 2042454 | 9/1980 |
| WO | 2012130230 A1 | 10/2012 |

OTHER PUBLICATIONS

Office Action for Swedish Patent Application No. 1350908-8 dated Jan. 7, 2014.
English Translation of Office Action in Chinese Patent Application No. 2014800415224 issued Sep. 1, 2016.

\* cited by examiner

SCRAPER BLADE ADAPTED TO SCRAPE OFF MATERIAL FROM A CONVEYOR BELT SURFACE AND SCRAPER FOR A CONVEYOR BELT

CROSS-REFERENCE TO RELATED APPLICATIONS

This application claims priority to PCT/EP2014/064885, filed Jul. 11, 2014, and published in English on Jan. 29, 2015 as publication number WO 2015/010921, which claims priority to SE Application No. 1350908-8, filed Jul. 22, 2013, incorporated herein by reference.

TECHNICAL FIELD

The invention relates to a scraper blade adapted to scrape off material from a conveyor belt surface and a scraper for a conveyor belt.

BACKGROUND ART

Conveyor belt scrapers are used in order to remove materials from conveyer belts and clean the conveyor belt surface when its cargo has been discharged. The cargo can basically be constituted by any type of material such as for example bulk solid materials including sand or gravel. The bulk solid materials that do not discharge from the belt at the desired discharge location through the action of gravity or centrifugal force accumulates on components of the belt cleaner or the conveyor belt surface and will cause productivity, cleanliness or safety problems. Therefore, it is conventional to use two types of scrapers in order to remove the cargo from the conveyor belt, a primary and a secondary scraper. The primary scraper is used to remove the material from the conveyor belt and the secondary scraper is used to remove the stickier material from the conveyor belt.

WO12130230A1, for example, discloses a belt transfer device comprising a belt conveyor consisting of a deflecting drum and a conveyor belt for the transport of material. A connection head is associated with the belt conveyor for the further transport of the material. The conveyor belt is designed as an upper strand when seen in the conveying direction before the passage of the deflecting drum and as a lower strand. In order to scrape off material from the conveyor belt, the deflecting drum is associated with a primary scraper and the lower strand is associated with a secondary scraper, the deflecting drum and the conveyor belt being arranged in one housing and the connection head being fastened to said housing. The scraper blades of the scrapers are pressed against the conveyor belt by means of a spring in order to keep contact with the same.

A problem that arises with the above mentioned conveyor belt scraper and other available prior art is that the tension of the spring gradually will decrease during use due to the wear of the blade. Since it has been shown that the spring will drop the recommended pressure of the scraper blade against the belt surface faster than the length of the scraper blade is worn down the spring must be re-tensioned several times during the service life of the scraper blade. This procedure is a safety risk when the conveyor belts are running especially since the scrapers normally are placed in areas which are hard to reach.

SUMMARY OF THE INVENTION

It is an objective of the present invention to provide an improvement of the above technique and other prior art. More particularly, it is an objective of this invention to provide an improved scraper blade which does not require any maintenance during its service life.

According to a first aspect of the invention these and other objectives, and/or advantages that will be apparent from the following description of embodiments, are achieved, in full or at least in part, by a scraper blade adapted to scrape off material from a conveyor belt surface, comprising a mounting portion at one end, and a scraper tip at the other end. The scraper blade is characterized by a scraper portion extending from the scraper tip and to a point adjacent to or in the mounting portion having at least one side wall which is tapered from the scraper tip towards the mounting portion. This is advantageous in that the special shape of the scraper blade will secure a constant pressure against the conveyor belt surface during its entire service life since the change of form of the scraper portion due to wear of the scraper blade will absorb the loss of force from the spring due to the decrease in tension of the spring during use. Thus, the need for re-tensioning of the spring will be eliminated which means that complicated and unsafe maintenance operations of the scraper blade can be avoided. The shape of the scraper blade is also designed to reduce a material build-up on the scraper tip of the scraper blade.

The scraper blade may comprise at least two opposing side walls which are tapered from the scraper tip towards the mounting portion. In one preferred embodiment the scraper blade comprises four side walls, two of which are opposing and tapered from the scraper tip towards the mounting portion and two of which are opposing and extend along a straight line from the scraper tip towards the mounting portion.

The scraper blade may comprise polyurethane which is an abrasion resistant material that will give the scraper blade a long service life.

The scraper tip may comprise tungsten carbide which hard material which is a very hard and stiff material with characteristic suitable for the scraper tip.

According to a second aspect of the invention, these and other objectives, and/or advantages that will be apparent from the following description of embodiments, are achieved, in full or at least in part, by a scraper for a conveyor belt, comprising at least one scraper blade adapted to scrape off material from a conveyor belt surface. The scraper is characterized in that it further comprises at least one gas spring adapted to press the at least one scraper blade against the conveyor belt surface. The characteristics of the gas spring is such that recommended force of the scraper blade against the belt surface due to the tension of the gas spring will be maintained during the entire service life of the scraper blade. In other words, the length of the scraper blade will wear down faster than the recommended pressure of the scraper blade against the belt surface will drop due to the decreased tension of the gas spring. Thus, the need for re-tensioning of the spring will be eliminated which means that complicated and unsafe maintenance operations of the scraper can be avoided.

The scraper blade may comprise a mounting portion at one end, a scraper tip at the other end, and a scraper portion extending from the scraper tip and to a point adjacent to or in the mounting portion and having at least one side wall which is tapered from the scraper tip towards the mounting portion. Further, the scraper blade may comprise at least two opposing side walls which are tapered from the scraper tip towards the mounting portion. In one preferred embodiment the scraper blade comprises four side walls, two of which are opposing and tapered from the scraper tip towards the mounting portion and two of which are opposing and extend along a straight line from the scraper tip towards the mounting portion. This is advantageous in that the special shape of the scraper blade will secure a constant pressure against the conveyor belt surface since the change of form of the scraper portion of the scraper blade will absorb the loss of force from the gas spring due to a decrease in tension of the gas spring during wear of the scraper blade. The shape of the scraper blade is also designed to reduce a material build-up on the scraper tip of the scraper blade.

The scraper blade may comprise polyurethane which is an abrasion resistant material that will give the scraper blade a long service life.

The scraper tip may comprise tungsten carbide which hard material which is a very hard and stiff material with characteristic suitable for the scraper tip. Other examples of suitable materials that the scraper tip may comprise include hard ceramics and hard metals.

The scraper may further comprise a scraper blade holder adapted to hold a plurality of scraper blades such that a large surface are of the conveyor belt can be cleaned at the same time.

The scraper may be a secondary scraper adapted to scrape off fine material from the conveyor belt surface.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figures 1A, 1B:
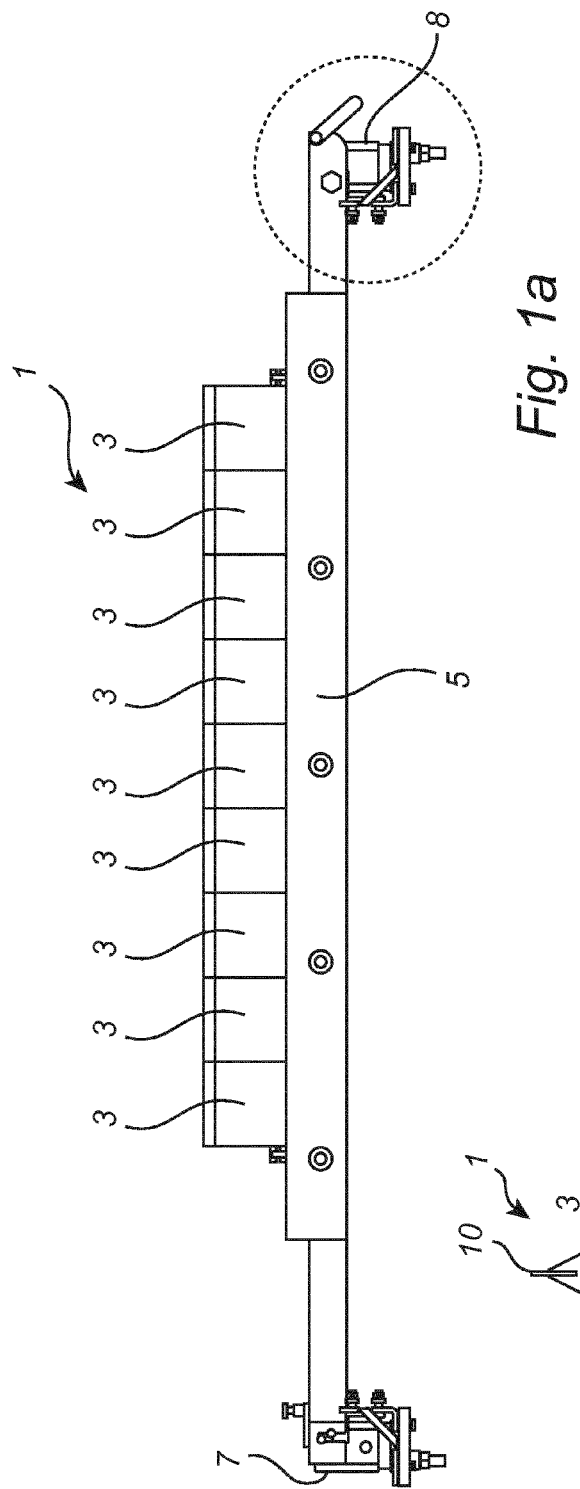
FIG. 1a is a side view of a scraper comprising a plurality of scraper blades according to one exemplary embodiment of the present invention.
FIG. 1b is a cross section of the scraper in FIG. 1a, FIG. 1c is an enlarged view of an outer end of the scraper in FIG. 1a, FIG. 2a is a perspective view of the scraper blade according to one exemplary embodiment of the present invention.

FIG. 1a illustrates a scraper 1 for a conveyor belt 2 according to one exemplary embodiment of the present invention. The scraper 1 comprises nine scraper blades 3 which are adapted to scrape off material from a conveyor belt surface 4 of the conveyor belt 2. The scraper blades 3 are attached to the scraper 1 by means of a scraper blade holder 5 which holds the scraper blades 3 in place during use of the scraper 1. The scraper blades 3 are releasably attached to scraper blade holder 5 so that they can be replaced when they have been worn down. The scraper further comprises a gas spring 6 provided on each one of the outer ends 7, 8 of the scraper 1. The two gas springs 6 are adapted to press the scraper blades 3 against the conveyor belt surface 4 during use in order to clean the conveyor belt 2 from stuck material so that material build up is avoided.

Figure 1C:
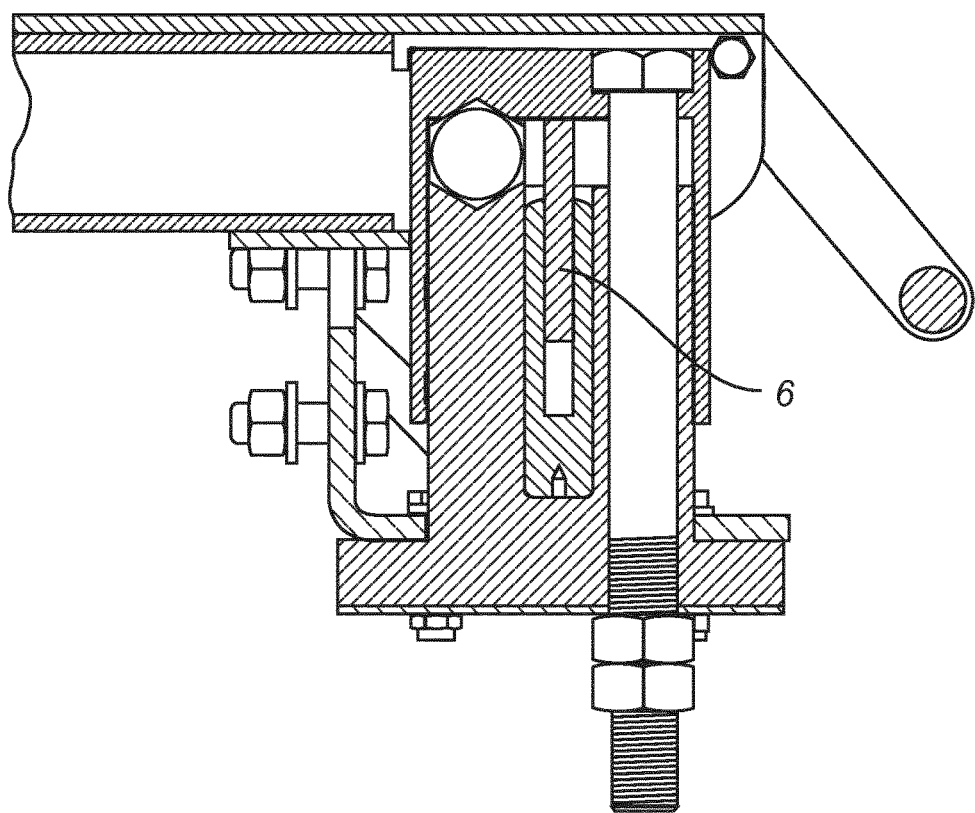

The scraper blades 3 comprise a mounting portion 9 at one end and a scraper tip 10 at the other end. The scraper blades 3 further comprise a scraper portion 11 extending from the scraper tip 10 and to a point in the mounting portion 9. The scraper tip 10 comprises tungsten carbide but it may also comprise ceramics and/or hard metals. FIG. 1b illustrates a cross section of the scraper disclosed in FIG. 1a and FIG. 1c is an exploded view of the outer end 8 of the scraper in FIG. 1a.

Figure 2A:
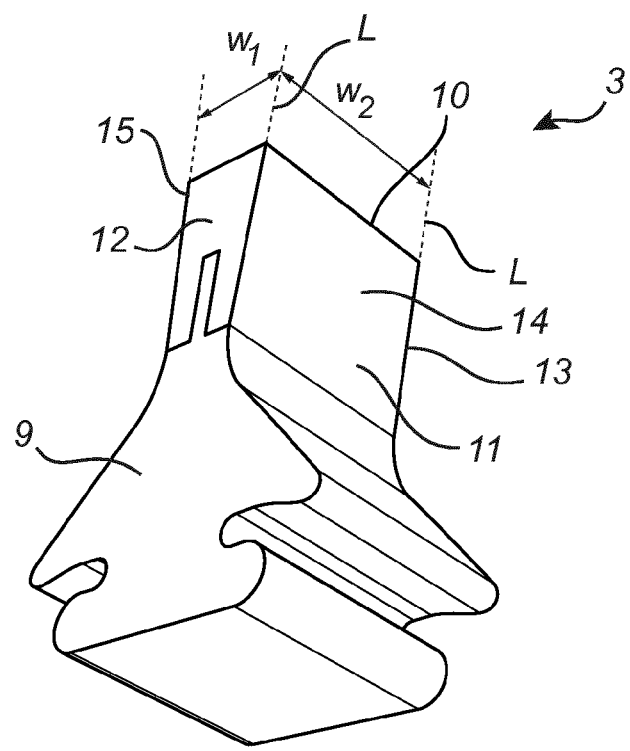
FIG. 2b is a cross section of the scraper blade in FIG. 2a, and FIG. 3 is a side view of a belt conveyer to which the scraper in FIGS. 1a and 1b is mounted.
Figure 2B:
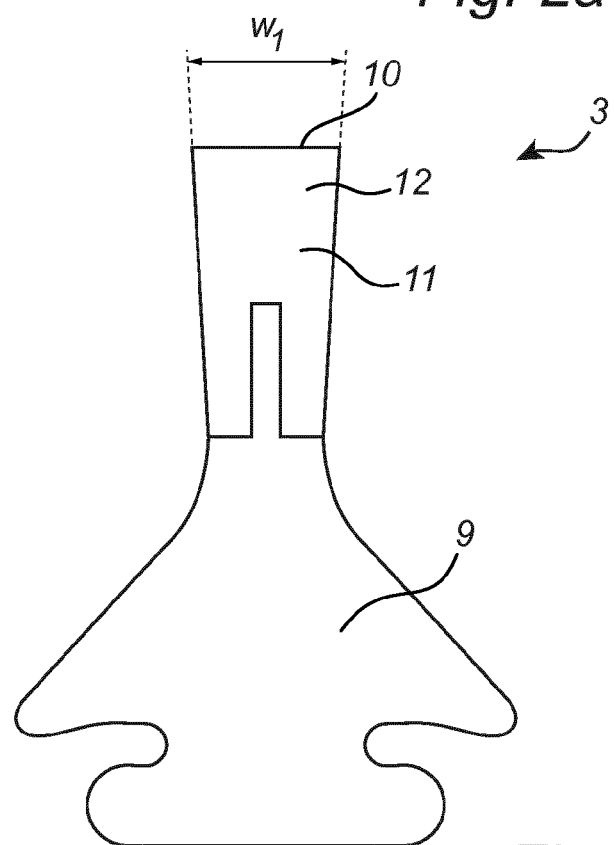

FIG. 2a illustrates the scraper blade 3 according to one exemplary embodiment of the present invention. The scraper blade 3 is adapted to scrape off material from the conveyor belt surface 4 and comprises a mounting portion 9 at one end and a scraper tip 10 at the other end. The scraper blade 3 further comprises a scraper portion 11 extending from the scraper tip 8 and to a point in the mounting portion 9. The scraper portion 11 has four side walls 12, 13, 14, 15, two of which side walls 12, 13 are opposing and tapered from the scraper tip 10 towards the mounting portion 9 and two of which side walls 14, 15 are opposing and extend along a straight line L from the scraper tip 10 towards the mounting portion 9. In other words, the width $W_1$ of the two side walls 12 and 13 of the scraper portion 11 is decreasing from the scraper tip 10 and down towards the mounting portion 9 while the width $W_2$ of the of the two side walls 14 and 15 of the scraper portion 11 remains the same from the scraper tip 10 and down towards the mounting portion 9. In this embodiment, the scraper blade 3 comprises polyurethane. FIG. 2b is a cross section of the scraper blade in FIG. 2a.

During use of the scraper blade 3 it is pressed against the conveyor belt surface 4 to be cleaned by a force applied from the tension of a spring in connection with the scraper blade 3. Naturally, the tension of the spring will gradually deteriorate during use due to wear and the force applied on the scraper blade 3 will accordingly decrease. However, due to the special shape of the scraper blade 3 where two of its side walls taper from the scraper tip 10 and down towards the mounting portion 9 the contact surface of the scraper tip 10 against the conveyor belt surface 4 will decrease gradually as the scraper portion of the scraper blade is worn down. The change of form of the scraper portion 3 of the scraper blade will absorb the loss of force from the spring due to the decrease in tension of the spring while maintaining a required pressure between belt and scraper tip, and the need for re-tensioning of the spring can thereby be avoided.

Figure 3:
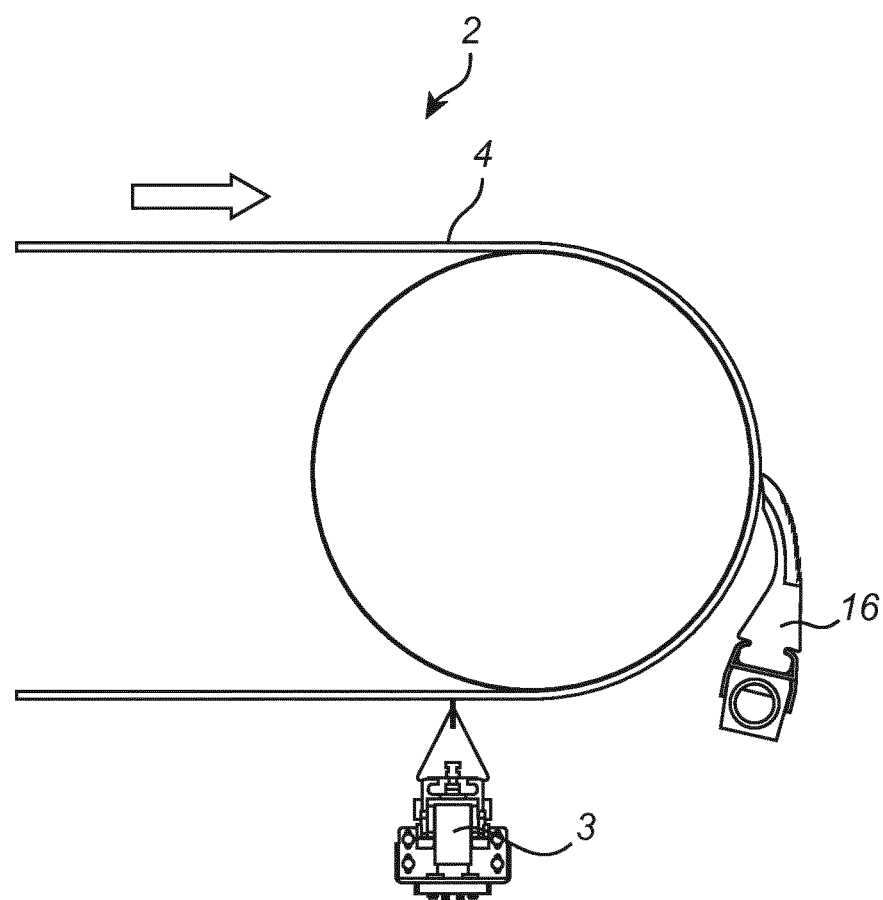

In FIG. 3, the belt conveyer 2 is illustrated. A primary scraper 16 is used to remove the material from the conveyor belt surface 4 of the conveyor belt 2 and the secondary scraper 1 is used to remove the stuck material from the conveyor belt surface 4 of the conveyor belt 2. As is evident from FIG. 3, the scraper 1, constituting the secondary scraper, is mounted so that the scraper tip 10 of each scraper blade 3 is pressed against the conveyor belt surface 4 of the conveyor belt 2 as this passes around the belt drum which rotates counter-clockwise with respect to FIG. 3.

The skilled person realizes that a number of modifications of the embodiments described herein are possible without departing from the scope of the invention, which is defined in the appended claims.

For instance, any suitable type of scraper blades may be used in connection with the scraper.

The shape, size and amount of the scraper blades may be varied beyond what is described above.

The amount, design and placement of the gas springs in the scraper may naturally also be varied.

The invention claimed is:

1. A scraper blade adapted to scrape off material from a conveyor belt surface, comprising:
    a mounting portion at one end; and
    a scraper tip at the other end,
    wherein a scraper portion extends from the scraper tip to a point adjacent to or in the mounting portion, the scraper portion having at least two opposing side walls which are each tapered in width from the scraper tip towards the mounting portion such that a contact surface of the scraper tip that contacts the conveyor belt surface decreases in area as the scraper portion of the scraper blade wears.

2. The scraper blade according to claim 1, wherein the scraper blade comprises four side walls, two of which sidewalls are opposing and tapered from the scraper tip towards the mounting portion and two of which sidewalls are opposing and extend along a straight line from the scraper tip towards the mounting portion.

3. The scraper blade according to claim 1, wherein the scraper blade comprises polyurethane.

4. The scraper blade according to claim 1, wherein the scraper tip comprises tungsten carbide.

5. A scraper for a conveyor belt, comprising:
    at least one scraper blade according to claim 1; and
    at least one gas spring adapted to press the at least one scraper blade against said conveyor belt surface.

6. The scraper according to claim 5, wherein the scraper further comprises a scraper blade holder adapted to hold a plurality of scraper blades.

7. The scraper according to claim 5, wherein the scraper is a secondary scraper adapted to scrape off fine material from the conveyor belt surface.

* * * * *